United States Patent [19]
Boberg et al.

[11] Patent Number: 6,000,706
[45] Date of Patent: *Dec. 14, 1999

[54] INDEPENDENT SUSPENSION FOR A VEHICLE AXLE WITH LEADING LOWER CONTROL ARM GEOMETRY

[75] Inventors: Evan S. Boberg, Hazel Park; Delbert D. DeRees, Romeo; Ralph A. Porcaro, Clinton Township, all of Mich.

[73] Assignee: Chrysler Corporation, Auburn Hills, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 08/795,060

[22] Filed: Feb. 5, 1997

Related U.S. Application Data

[60] Provisional application No. 60/017,669, May 14, 1996.

[51] Int. Cl.⁶ .................................................. B60G 3/20
[52] U.S. Cl. ........................... 280/124.135; 280/124.145; 280/124.15
[58] Field of Search .................................. 280/690, 691, 280/660, 673, 675, 124.125, 124.135, 124.136, 124.15, 124.1, 124.39, 124.143, 124.145, 124.146, 124.154

[56] References Cited

U.S. PATENT DOCUMENTS

| | | |
|---|---|---|
| 2,757,017 | 7/1956 | Matthias et al. . |
| 3,189,118 | 6/1965 | Arning . |
| 3,209,852 | 10/1965 | Kozicki . |
| 3,422,918 | 1/1969 | Musser, Jr. et al. . |
| 4,046,403 | 9/1977 | Yoshida . |
| 4,440,419 | 4/1984 | Kosak et al. . |
| 4,511,160 | 4/1985 | Inoue . |
| 4,515,391 | 5/1985 | Koide . |
| 4,650,211 | 3/1987 | Tanahashi . |
| 4,671,531 | 6/1987 | Sautter et al. ........................... 280/690 |
| 4,729,578 | 3/1988 | Kondo . |
| 4,790,560 | 12/1988 | Asanuma . |
| 4,875,705 | 10/1989 | Koyama . |
| 4,887,839 | 12/1989 | Yoshimoto . |
| 4,978,131 | 12/1990 | Edahiro . |
| 4,986,565 | 1/1991 | Hajto . |
| 4,991,867 | 2/1991 | Washizu et al. . |
| 5,435,591 | 7/1995 | Lee ......................................... 280/691 |
| 5,513,874 | 5/1996 | Mori ................................ 280/124.135 |
| 5,597,171 | 1/1997 | Lee ......................................... 280/691 |
| 5,697,633 | 12/1997 | Lee ......................................... 280/691 |

OTHER PUBLICATIONS

Rover 3500S "Rover Safety" from Rover 2000 Parts Catalogue Apr. 1969.

*Primary Examiner*—Paul N. Dickson

[57] ABSTRACT

An independent suspension system for a vehicle driving axle is disclosed which includes a leading lower control arm which pivots about an axis which is nearly perpendicular to the upper control arm pivot axis and which is nearly perpendicular to the vehicle center line. By providing this perpendicular relationship between the pivot axes of the upper and lower control arms, an imaginary steering point results. This new imaginary steering point allows for improved vertical wheel travel, while minimizing the distance of half shaft plunge. By improving the vertical wheel travel and minimizing the distance of half shaft plunge, the ride of the vehicle is improved.

10 Claims, 3 Drawing Sheets

INDEPENDENT SUSPENSION FOR A VEHICLE AXLE WITH LEADING LOWER CONTROL ARM GEOMETRY

This application is a United States Patent Application based on U.S. Provisional Patent Application Serial No. 60/017,669, filed May 14, 1996, priority to which is claimed.

BACKGROUND OF THE INVENTION

1. Field of the Invention

The present invention relates generally to an independent suspension system for an automobile, and more particularly, to an independent suspension system with a leading lower control arm.

2. Description of the Related Art

Independent suspensions for conventional vehicles typically include a suspension system which has an upper control arm and a lower control arm attached to the wheel of the vehicle. As the vehicle is driven, the wheel bounces up and down in response to bumps in the road and during cornering. As this is going on, the travel of the wheel is controlled by both the upper and lower control arms as they pivot on axes which are nearly parallel to one another and with the center line of the vehicle. In conventional vehicles, the suspension system is attached to a drive shaft via a joint which can extend or retract as needed when the suspension moves. These joints may include splines, or other standard means of joining.

During the operation of the vehicle, the joint has to adjust in order to compensate for the distance that has been traveled by the wheel. Upon looking at the suspension mechanism from the rear of the vehicle, one can see that the upper and lower control arms essentially define a trapezoidal configuration. As the wheel flexes up and down in response to jounce and rebound, the trapezoid moves and creates a radius that pulls the joint back and forth, causing "halfshaft plunge". The distance that the joint moves, i.e, the "halfshaft plunge", is desirably kept to a minimum to add driveability and control of the vehicle.

In a front wheel drive car, there is generally a half shaft and a C-joint, the constant velocity joint. The half shaft extends from the transmission to the wheel. As the suspension moves, the halfshaft moves in and out to compensate for the radius which is created during the travel of the wheel. If the C-joint needs to move and become greatly displaced in order to compensate for the radius which is created, the C-joint itself can be put into a "weak" condition.

Minimizing the distance that the half shaft has to move is advantageous. In order to optimize roll understeer, anti-acceleration squat, and anti-brake lift, various configurations for the upper and lower control arms have been investigated in the past. Optimally, we want the halfshaft to move up and down directly without causing the C-joint to move in and out very much. This will stop the C-joint from traveling a great distance.

As an automobile is driven, the C-joint moves in and out, and it is desirable to minimize the travel from this in-and-out movement in order to give better stability to the suspension system. Furthermore, in normal operation of a vehicle, undesirable characteristics arise during weight transfer of the vehicle due to acceleration and braking. During acceleration, the rear of the vehicle "squats", while during braking, the rear of the vehicle "lifts". During a cornering operation, a combination of various vector forces cause an additional, more complicated set of problems. Therefore, it would be advantageous to optimize the geometry of the independent suspension system such that the vector forces and the wheel travel are optimized.

The imaginary steering point which is created by the geometry of the independent suspension system has been investigated by the present inventors, and has led them to the following invention.

Therefore, the present invention seeks to provide an independent suspension system having the advantage of allowing for an increased wheel travel without penalty to the drive train components by minimizing the in-and-out movement of the C-joint and thereby resulting in an improved ride without compromising the handling of the vehicle.

SUMMARY OF THE INVENTION

In accordance with the present invention, an independent suspension system is proposed with a leading lower control arm which pivots about an axis which is nearly perpendicular to the vehicle center line. Contrary to tradition, the upper control arm pivots about an axis nearly parallel to the vehicle center line, as is the case in a typical vehicle installation. Consequently, the pivoting axis of the lower control arm is perpendicular to the pivoting axis of the upper control arm. This results in providing up to ten inches of vertical wheel travel with less than twelve millimeters of half shaft plunge. Further in accordance with the present invention, a knuckle is included for stabilizing the suspension system. The upper and lower control arms are attached to the knuckle.

The combination of these features yields an imaginary steering point about which the upper control arm and the lower control arm essentially pivot so that the half shaft plunge is minimized while allowing the wheel to travel as far as possible. This yields several advantages, including an improved ride which is primarily due to large wheel travel and uncompromised handling as camber gain nearly matches vehicle roll. The increased wheel travel is achieved without substantial penalty to the drive train components.

DETAILED DESCRIPTION OF THE DRAWINGS

Figure 1A:
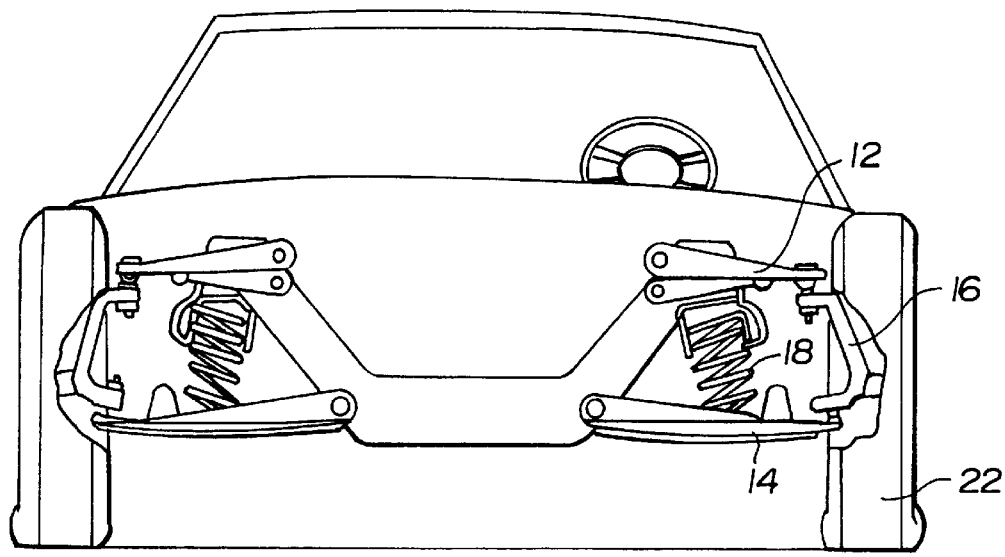
FIG. 1A is a partially schematic view from the rear in the driving direction of an independent suspension system of the parallel pivot construction of the prior art.

The present invention concerns an independent suspension system for a front wheel drive vehicle having a double wishbone upper and lower control arm configuration also employing a half shaft and a constant velocity joint, or C-joint. The half shaft protrudes from the transmission at the centerline of the vehicle, and extends to the wheel. The C-joint connects the half shaft to the wheel, and is able to move in and out in order to compensate for dimension created by the vehicle during normal steering conditions.

The distance that the C-joint moves is optimized when it journeys the least amount, when considering the traveling distance of the wheel as it moves up and down in response to the road conditions. The wear and tear on the drivetrain components would be minimized as the halfshaft plunge distance is minimized. Traditionally, the plunge distance was more governed by the wheel travel than in the present invention.

The main advantage of the present invention is that the double wishbone upper and lower control arm configuration includes a leading lower control arm having a pivot axis which is substantially perpendicular to the pivot axis of the upper control arm, thereby improving the ride and driveability.

In the preferred embodiment, the pivot axes between the upper control arm and the lower control arm are approximately 77° apart, rather than the substantially parallel axes of the prior art. Typically, prior art axes are less than 20° different from each other.

The prior art control arms, when combined with the other components of a traditional suspension system, form a trapezoidal configuration that flex up and down with the road conditions. As the trapezoid flexes, the boundaries of the system, i.e. the drive shaft plunge, moves in and out giving rise to a radial arc journey path that can be detrimental to the drivetrain components as well as the driveability of the vehicle.

In essence, the present invention provides a suspension system as the upper control arm pivots in one direction, the pivot axis of the lower control arm is relatively perpendicular, which establishes a new imaginary steering point that is more stable than conventional systems. This imaginary steering point remains essentially constant even though the wheel is traveling relatively large distances. Consequently, a vertical wheel travel of ten inches (10") can be achieved while the halfshaft plunge is less than 12 mm. This is because the halfshaft plunge occurs at the essentially constant position which is created by the opposing pivoting axes.

As one can imagine, if the upper control arm pivots in one direction up and down, and the lower control arm pivots up and down in a basically perpendicular fashion, this creates a unique vector combination that stays relatively stationary at the intersection between the two axes. This relatively stationary new pivot "point" is the imaginary steering point that minimizes the halfshaft plunge while allowing lots of movement all around it. Furthermore, it is this effect that gives a camber gain that nearly matches vehicle roll.

Figure 1B:
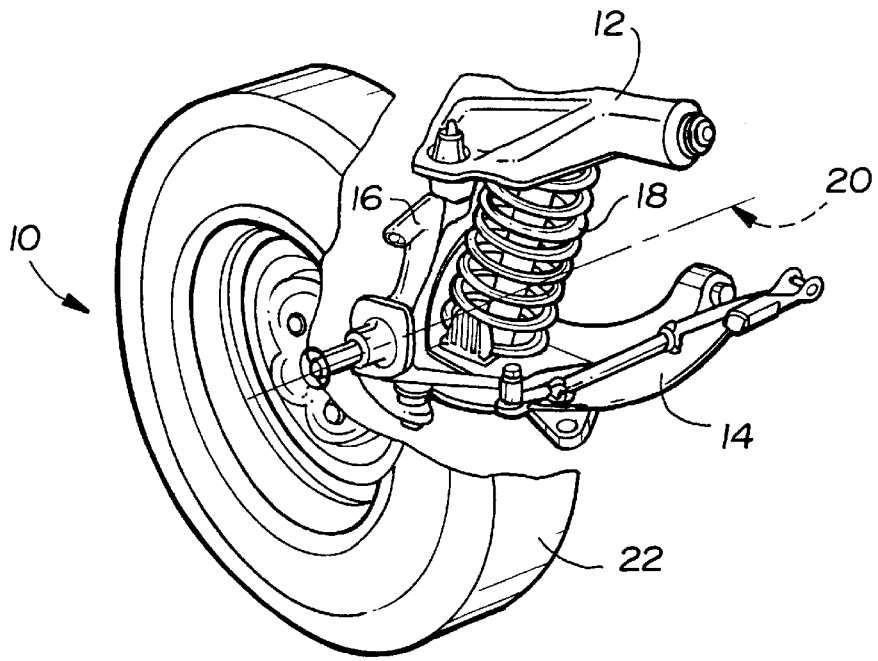
FIG. 1B is a perspective view of an independent suspension system of the parallel pivot construction of the prior art.

Referring now to the drawings, with the exception of the prior art FIG. 1, like reference characters designate corresponding parts throughout the Figures. FIG. 1 depicts a typical prior art configuration in which the conventional double wishbone upper and lower control arms have pivoting axes that are essentially parallel to the longitudinal centerline axis of the vehicle. Numeral 10 designates the suspension system as a whole, while numeral 12 relates to the upper control arm. Lower control arm 14 is in communication with upper control arm 12 by its connection to spindle 16. Spring assembly 18 acts to dampen the system. Drive shaft axis 20 runs through the wheel 22. The trapezoidal configuration discussed above becomes apparent with the upper and lower control arms being the top and bottom of the trapezoid, while the spindle and spring define the sides of the trapezoid. As one can imagine, when one looks at FIG. 1, one can see that the trapezoid flexes when the wheel travels up and down. This causes the in-and-out motion described above as the halfshaft axis must follow a radial arc because it is still connected to the upper and lower control arms.

Figure 2:
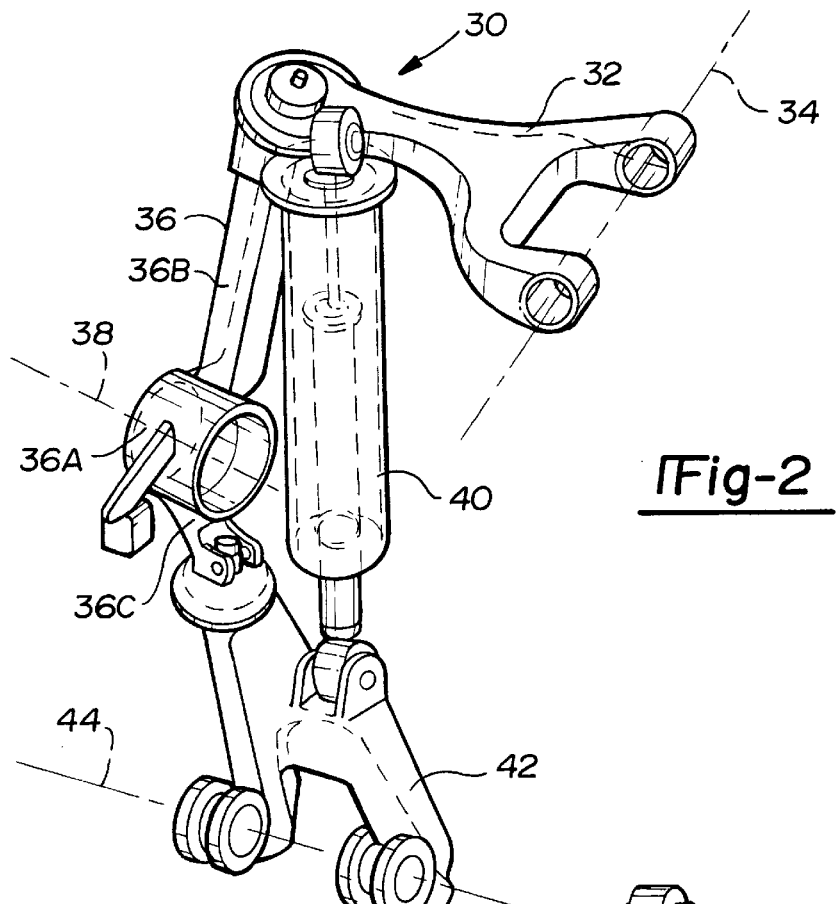
FIG. 2 is a perspective view of the independent suspension system in accordance with the present invention.

FIG. 2 is a perspective view of the preferred embodiment of the independent suspension system in accordance with the present invention 30. Although the wishbone configuration is very practical and popular in the automotive industry, our invention is not limited to such a configuration. Rather, it is our preferred embodiment, while other configurations are suitable, and many will be apparent to those of ordinary skill in the art. Upper control arm 32 has a wishbone configuration with pivot axis 34 running essentially parallel to the longitudinal centerline of the vehicle. Knuckle 36 acts as the stabilizer between the two control arms, and has the driveshaft axis 38 running therethrough. Shock and spring assembly 40 act as a dampening means. In this embodiment, lower control arm 42 also has a wishbone configuration, but with a pivot axis 44 that preferably runs 77° apart from the pivot axis 34 of the upper control arm. Both wishbone-shaped control arms have their apexes of the wishbone connected to knuckle 36, although other connections of a like manner may be utilized. Knuckle 36 includes a central hub portion 36a and an integrally formed upper arm 36b extending upwardly from the hub portion 36a and an integrally formed lower arm 36c extending generally downwardly from the hub portion 36a. Upper arm 36b is attached to the upper control arm 32 and lower arm 36c is attached to the lower control arm 42.

Figure 3:
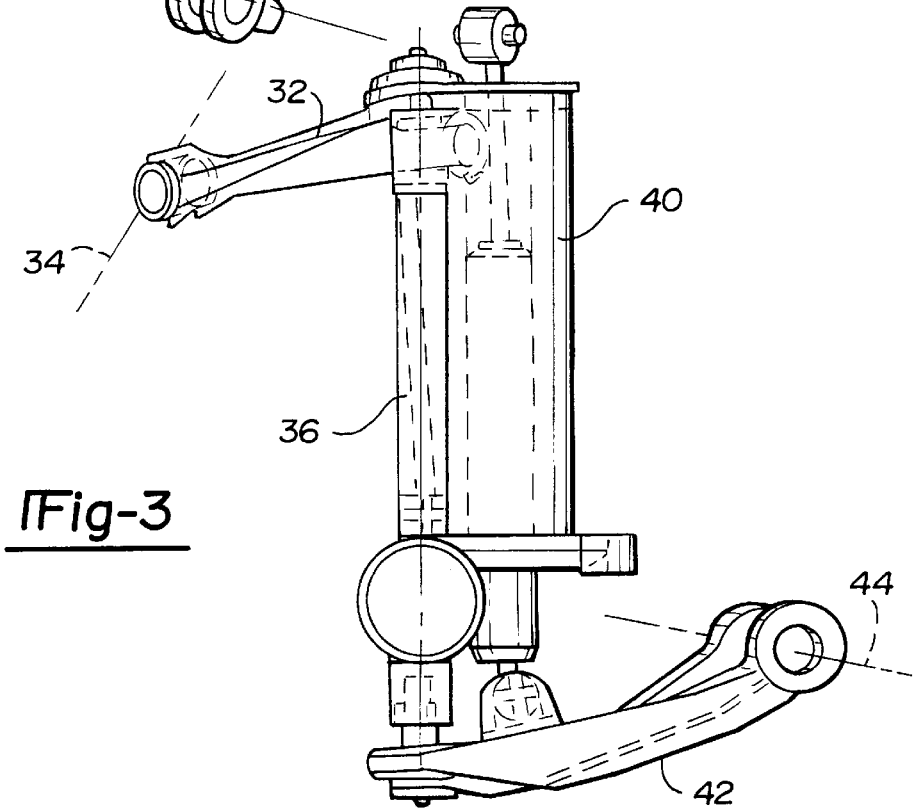
FIG. 3 is a side view of the present invention.

Referring now to FIG. 3, a side view of the present invention is illustrated, showing the relative placement of the control arm placement. Again, upper control arm 32 is shown with pivot axis 34, and is shown being attached to knuckle 36. Spring and shock assembly 40 is shown as attached between upper control arm 32 and lower control arm 42.

Figure 4:
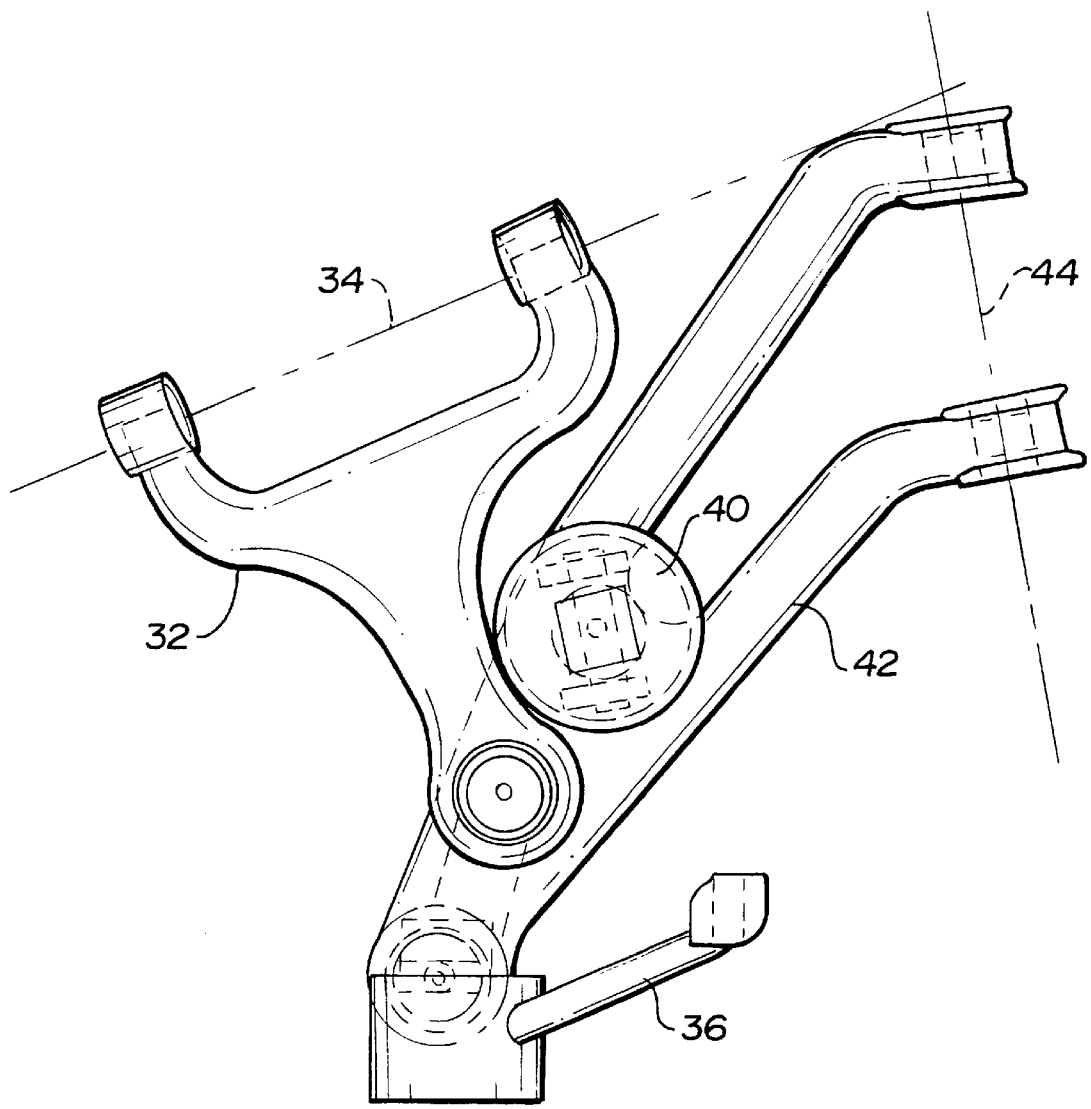
FIG. 4 is a top plan view of the present invention.

FIG. 4 is a top plan view of the present invention, and gives the clearest illustration of the nearly perpendicular relationship between the pivot axis 34 of the upper control arm 32 and the pivot axis 44 of the leading lower control arm 42. Their interrelationship with the spring and shock assembly 40 is clearly illustrated in the preferred embodiment. It is estimated that angles of from about 65° to about 90° can be utilized in order to achieve the benefits discussed above.

We claim:

1. An independent suspension system for a vehicle, comprising:

an upper control arm connectable to the vehicle so as to pivot about a first axis arranged substantially parallel to the longitudinal centerline axis of the vehicle;

a lower control arm connectable to the vehicle so as to pivot about a second axis arranged substantially perpendicular to the longitudinal centerline axis of the vehicle;

a knuckle including a hub portion having a hole with a central axis defining a drive shaft axis between the upper and lower control arms, said knuckle having an upper arm immovably fixed to and radially extending from an upper section of said hub portion and attached to said upper control arm and a lower arm immovably fixed to and radially extending from a lower section of said hub portion and pivotally connected to said lower control arm;

such that said first and second pivot axes are substantially perpendicular with respect to one another; and a shock and spring assembly mounted to and extending generally vertically from said lower control arm.

2. The suspension system of claim 1, wherein the first and second pivot axes being substantially perpendicular with respect to one another have a relative angle of between about 65° and about 90°.

3. The suspension system of claim 1, wherein the first and second pivot axes being substantially perpendicular with respect to one another have a relative angle of about 77°.

4. An independent suspension system for a vehicle, comprising:
- an upper control arm having a wishbone configuration connectable to the vehicle so as to pivot about a first axis arranged substantially parallel to the longitudinal centerline axis of the vehicle;
- a lower control arm having a wishbone configuration connectable to the vehicle so as to pivot about a second axis arranged substantially perpendicular to the longitudinal centerline axis of the vehicle;
- a knuckle including a hub portion having a hole with a central axis defining a drive shaft axis between the upper and lower control arms, said knuckle having an upper arm immovably fixed to and radially extending from an upper section of said hub portion and attached to said upper control arm and a lower arm immovably fixed to and radially extending from a lower section of said hub portion and pivotally connected to said lower control arm;
- such that said first and second pivot axes are substantially perpendicular with respect to one another; and
- a shock and spring assembly mounted to and extending generally vertically from said lower control arm.

5. The suspension system of claim 4, wherein the upper control arm having a wishbone configuration is connected to the knuckle at the apex of the wishbone.

6. The suspension system of claim 4, wherein the lower control arm having a wishbone configuration is connected to the knuckle at the apex of the wishbone.

7. The suspension system of claim 4, wherein the first and second pivot axes being substantially perpendicular with respect to one another have a relative angle of between about 65° and about 90°.

8. The suspension system of claim 4, wherein the first and second pivot axes being substantially perpendicular with respect to one another have a relative angle of about 77°.

9. An independent suspension system on a vehicle, comprising:
- an upper control arm pivoting about a first axis arranged substantially parallel to the longitudinal centerline axis of the vehicle;
- a lower control arm pivoting about a second axis arranged substantially perpendicular to the longitudinal centerline axis of the vehicle; and
- a knuckle having a hub portion having a hole with a central axis defining a drive shaft axis between the upper and lower control arms, said knuckle having an upper arm immovably fixed to and radially extending generally upward from said hub portion and attached to said upper control arm and a lower arm immovably fixed to and radially extending generally downward from said hub portion and pivotally connected to said lower control arm;
- such that said first and second pivot axes are substantially perpendicular with respect to one another; and
- a shock and spring assembly mounted to and extending generally vertically from said lower control arm.

10. The suspension system of claim 9, wherein the lower control arm is arranged in a leading position with respect to the vehicle.

* * * * *